(12) United States Patent  
Miyazaki et al.

(10) Patent No.: US 10,215,407 B2  
(45) Date of Patent: Feb. 26, 2019

(54) EXHAUST GAS TREATMENT APPARATUS

(71) Applicant: Ebara Corporation, Tokyo (JP)

(72) Inventors: Kazutomo Miyazaki, Tokyo (JP); Tetsuo Komai, Tokyo (JP); Toyoji Shinohara, Tokyo (JP); Seiji Kashiwagi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 15/556,582

(22) PCT Filed: Nov. 6, 2015

(86) PCT No.: PCT/JP2015/081332  
§ 371 (c)(1),  
(2) Date: Sep. 7, 2017

(87) PCT Pub. No.: WO2016/143193  
PCT Pub. Date: Sep. 15, 2016

(65) Prior Publication Data  
US 2018/0051878 A1    Feb. 22, 2018

(30) Foreign Application Priority Data

Mar. 12, 2015  (JP) ................. 2015-050041  
Oct. 30, 2015  (JP) ................. 2015-213909

(51) Int. Cl.  
*F23G 7/06* (2006.01)  
*F01N 3/24* (2006.01)  
(Continued)

(52) U.S. Cl.  
CPC ............... *F23G 7/065* (2013.01); *F01N 3/24* (2013.01); *F23C 3/00* (2013.01); *F23G 7/06* (2013.01); *F23L 1/00* (2013.01); *F23M 5/08* (2013.01); *B01D 2251/102* (2013.01); *B01D 2257/20* (2013.01); *B01D 2258/0216* (2013.01)

(58) Field of Classification Search  
None  
See application file for complete search history.

(56) References Cited

U.S. PATENT DOCUMENTS 3,215,501 A  11/1965 Phillips  
4,218,426 A   8/1980 Dahmen  
(Continued)

FOREIGN PATENT DOCUMENTS

CN    2404005 Y    11/2000  
EP  1 933 088 A2    6/2008  
(Continued)

OTHER PUBLICATIONS

Komai et al. JP2002-106825A—translated document (Year: 2002).*

(Continued)

*Primary Examiner* — Walter D. Griffin  
*Assistant Examiner* — Jelitza M Perez  
(74) *Attorney, Agent, or Firm* — Pearne & Gordon LLP

(57) ABSTRACT

A hybrid stepping motor has a connector housing formed integrally with an insulator having an upper insulator and a lower insulator. The hybrid stepping motor includes a stator core and output terminals concentrically disposed outside the stator core. A wiring pattern serving as the output terminals has connector pins and land portions disposed eccentrically with respect to one another. The land portions are formed on an outer edge side of the wiring pattern. A surface, which is an uppermost surface of the wiring pattern, is located below a lowermost surface, in which jumper wires and lead wires pass, of the lower insulator. The lead wires are pulled out from a lower side, and are pulled out to guiding grooves.

4 Claims, 6 Drawing Sheets

(51) Int. Cl.
*F23L 1/00* (2006.01)
*F23M 5/08* (2006.01)
*F23C 3/00* (2006.01)

(56) References Cited

U.S. PATENT DOCUMENTS

| | | |
|---|---|---|
| 2002/0041836 A1 | 4/2002 | Komai et al. |
| 2005/0106517 A1 | 5/2005 | Okada et al. |
| 2005/0135984 A1 | 6/2005 | Ferron et al. |
| 2014/0295362 A1 | 10/2014 | Kawamura et al. |
| 2014/0348717 A1* | 11/2014 | Kawamura ............ F04B 37/06 422/173 |

FOREIGN PATENT DOCUMENTS

| | | |
|---|---|---|
| JP | S42-13072 B1 | 7/1967 |
| JP | 09229346 A * | 9/1997 |
| JP | H09-229346 A | 9/1997 |
| JP | 2002-106825 A | 4/2002 |
| JP | 2002106825 A * | 4/2002 |
| JP | 2004-093116 A | 3/2004 |
| JP | 2007-519878 A | 7/2007 |
| JP | 2008-161861 A | 7/2008 |
| JP | 4937886 B2 | 5/2012 |
| JP | 2014-190683 A | 10/2014 |
| JP | 5623676 B1 | 11/2014 |

OTHER PUBLICATIONS

Shimizu et al. JP09229346A—translated document (Year: 1997).*
International Search Report issued in Patent Application No. PCT/JP2015/081332 dated Feb. 2, 2016.
Written Opinion issued in Patent Application No. PCT/JP2015/081332 dated Feb. 2, 2016.
Extended European Search Report issued in European Patent Application No. EP 15 88 4677 dated Oct. 22, 2018.

* cited by examiner

EXHAUST GAS TREATMENT APPARATUS

TECHNICAL FIELD

The present invention relates to an exhaust gas treatment apparatus for treating an exhaust gas, discharged from a manufacturing apparatus or the like for manufacturing semiconductor devices, liquid crystals, LEDs or the like, by combustion treatment to make the exhaust gas harmless.

BACKGROUND ART

Gases including a harmful and combustible gas, such as silane gas ($SiH_4$) or halogen-based gas ($NF_3$, $ClF_3$, $SF_6$, $CHF_3$, $C_2F_6$, $CF_4$), are discharged from a semiconductor manufacturing apparatus. Such an exhaust gas (processing gas) cannot be emitted into the atmosphere as it is. Therefore, the exhaust gas is generally introduced into an abatement apparatus where the exhaust gas is made harmless by oxidation through combustion. As this treatment method, a combustion-type exhaust gas treatment apparatus in which a fuel gas is used to form a flame in a furnace and to perform exhaust gas treatment therein is widely used.

In a combustion-type exhaust gas treatment apparatus for use in a semiconductor industry and a liquid crystal industry, a fuel and an oxidizing gas (oxygen-containing gas) are mixed to combust the fuel and to form a flame, and a processing gas is mixed with the flame to perform gas treatment. Therefore, a large amount of dust (mainly $SiO_2$) and a large amount of an acid gas as by-products of combustion treatment of the exhaust gas are expected to be generated. As a conventional combustion oxidation method, a method in which LNG and pure oxygen are used to form a pure-oxygen flame having a high temperature and a processing gas is heated by the high-temperature pure-oxygen flame to be decomposed is known. However, this method is problematic in that nitrogen contained in the exhaust gas is decomposed by the high-temperature flame resulting from the attributes of pure-oxygen combustion, thereby generating a large amount of nitrogen oxide (NOx) additionally.

Further, there has been also known a method for forming a flame by air without using pure oxygen, and heating a processing gas at a relatively low-temperature by mixing the processing gas with the flame. In this case, generation of nitrogen oxide (NOx) is suppressed, but decomposition performance of a persistent gas such as PFCs requiring a high-temperature flame is lowered. Further, this method has a problem of generating CO because the flame has a low temperature.

Further, in the combustion-type exhaust gas treatment apparatus, it is necessary to perform regular maintenance for removing powdery product attached to and deposited on an inner wall surface of a combustion chamber. Therefore, an additional mechanism, such as a scraper, is required to regularly scrape off the powdery product attached to and deposited on the inner wall surface of the combustion chamber.

Patent document 1 discloses a combustion-type exhaust gas treatment apparatus which does not necessitate a mechanism such as a scraper for scraping off powdery product. In the combustion-type exhaust gas treatment apparatus disclosed in patent document 1, a combustion treatment unit of an exhaust gas as an object to be treated comprises an exhaust gas treatment combustor (burner) for forming a flame therein, a cylindrical body provided below the exhaust gas treatment combustor, a water reservoir provided between the exhaust gas treatment combustor and the cylindrical body, and a water-film formation mechanism for forming a water film on an inner wall surface of the cylindrical body. In the combustion treatment unit, a flame is formed in the combustor, combustion treatment (heating treatment) of the exhaust gas is performed in a combustion treatment chamber, inside the cylindrical body, disposed at the downstream side of the flame, and a swirling flow of water is formed in the water reservoir to form a spiral water film on the inner wall surface of the cylindrical body. According to this patent document 1, the following description is made: Because the water film is formed on the inner wall surface of the cylindrical body, heat insulation is performed by the water film, and an inexpensive material such as stainless steel can be used for the cylindrical body. Further, the water film can wash away the powdery product to prevent the powdery product from adhering to the inner wall surface of the cylindrical body. Furthermore, the water film can wash away a corrosive gas to prevent the inner wall surface of the cylindrical body from being damaged.

CITATION LIST

Patent Literature

Patent document 1: Japanese patent No. 4937886

SUMMARY OF INVENTION

Technical Problem

In the conventional combustion-type exhaust gas treatment apparatus including the above patent document 1, a fuel (fuel gas) and an oxidizing gas (oxygen-containing gas) are mixed to combust the fuel and to form a flame, and a processing gas (exhaust gas) is mixed with the flame formed in the burner whereby heating treatment of the processing gas is performed. Specifically, the flame is formed in advance in the combustion chamber, and the processing gas is heated and treated by the formed flame.

However, such conventional combustion method has the following problems.

(1) In the case of forming the high-temperature flame by using pure oxygen.

A. The burner body for forming the flame becomes high temperature, and hence suffers thermal damage.

B. The high-temperature flame and the processing gas (containing $N_2$ gas as one of main components) are brought in contact with each other, thereby generating a large amount of thermal NOx.

(2) In the case of forming the flame having a relatively low-temperature by using air A. Because the persistent gas such as PFCs necessitates high reaction treatment temperature, gas treatment performance of the persistent gas is lowered, and CO is generated as a by-product gas.

B. Because as a measure for the product deposited in the combustion chamber, water for forming wet wall cannot be flowed in the combustion chamber, an additional mechanism such as a scraper is required.

Because the conventional method in which a fuel and an oxidizing gas (oxygen-containing gas) are mixed to form a flame, and a processing gas (exhaust gas) is heated and treated by the flame formed in the burner has the above-mentioned various problems, the present inventors have studied a new combustion method intensively. As a result of intensive study, the present inventors have conceived mixed combustion (co-combustion) of three kinds of gases comprising a fuel (fuel gas), an oxidizing gas (oxygen-containing gas) and a processing gas, and have conceived to blow the three kinds of gases, respectively, in a tangential direction to the inner circumferential surface of the combustion chamber for performing the mixed combustion of the three kinds of gases.

It is therefore an object of the present invention to provide an exhaust gas treatment apparatus which can perform gas treatment having a high combustion efficiency by mixed combustion (co-combustion) of three kinds of gases comprising a fuel, an oxidizing gas and a processing gas and can suppress generation of thermal NOx and generation of CO by blowing the fuel, the oxidizing gas and the processing gas, respectively, in a tangential direction to an inner circumferential surface of a combustion chamber.

Solution to Problem

In order to achieve the above object, according to one aspect of the present invention, there is provided an exhaust gas treatment apparatus for treating a processing gas by combustion treatment to make the processing gas harmless, the exhaust gas treatment apparatus comprising: a cylindrical combustion chamber configured to combust a processing gas; and a fuel nozzle, an oxidizing gas nozzle and a processing gas nozzle provided on the combustion chamber and configured to blow a fuel, an oxidizing gas and the processing gas, respectively, in a tangential direction to an inner circumferential surface of the combustion chamber; wherein the fuel nozzle, the oxidizing nozzle and the processing gas nozzle are positioned in the same plane perpendicular to an axis of the combustion chamber. Here, "three nozzles are positioned in the same plane" is defined as "portions of openings at the inner circumferential surface side of the combustion chamber in the three nozzles are positioned in the same plane."

According to the present invention, by blowing the fuel (fuel gas), the oxidizing gas (oxygen-containing gas), and the processing gas (exhaust gas) into the combustion chamber, respectively, in a tangential direction to the inner circumferential surface of the cylindrical combustion chamber, the fuel and the processing gas are combusted by the oxidizing gas to form a cylindrical mixed flame. Specifically, in the combustion chamber, the cylindrical mixed flame of a mixture of the three kinds of gases is formed in the same combustion field, and the processing gas can be combusted.

In a preferred aspect of the present invention, a water supply nozzle for forming a water film on the inner circumferential surface of the combustion chamber is provided at a location distant in an axial direction of the combustion chamber from a blowing position of the fuel, the oxidizing gas and the processing gas.

According to the present invention, a water film (wet wall) can be formed on the inner wall surface (inner circumferential surface) of the combustion chamber in the outer side of the cylindrical mixed flame of a mixture of the three kinds of gases.

In a preferred aspect of the present invention, by blowing the fuel, the oxidizing gas and the processing gas, respectively, in the tangential direction to the inner circumferential surface of the combustion chamber, a cylindrical mixed flame is formed in the combustion chamber.

According to the present invention, a distribution in which the three kinds of unburned gases mixed together and having a low temperature and a heavy weight are positioned at an outer part of the cylindrical mixed flame, and a gas having a high temperature and a light weight after the three kinds of gases mixed together are burned is positioned at an inner part of the cylindrical mixed flame is formed by a swirling centrifugal force. Therefore, the cylindrical mixed flame becomes in a state where the cylindrical mixed flame is covered with the three kinds of unburned gases mixed together and having a low temperature and is thus thermally self-insulated, and hence a lowering of temperature due to heat dissipation does not occur and the gas treatment having a high combustion efficiency can be performed.

In a preferred aspect of the present invention, the water film on the inner circumferential surface of the combustion chamber is swirled by a swirling force of the cylindrical mixed flame.

According to another aspect of the present invention, there is provided an exhaust gas treatment apparatus for treating a processing gas by combustion treatment to make the processing gas harmless, the exhaust gas treatment apparatus comprising: a cylindrical combustion chamber configured to combust a processing gas; and a fuel nozzle, an oxidizing gas nozzle and a processing gas nozzle provided on the combustion chamber and configured to blow a fuel, an oxidizing gas and the processing gas, respectively, in a tangential direction to an inner circumferential surface of the combustion chamber; wherein the fuel nozzle, the oxidizing gas nozzle and the processing gas nozzle blow the fuel, the oxidizing gas and the processing gas, respectively, in a tangential direction to the inner circumferential surface of the combustion chamber to form a swirling flow of a mixture of three kinds of the fuel, the oxidizing gas and the processing gas.

According to the present invention, by blowing the fuel (fuel gas), the oxidizing gas (oxygen-containing gas), and the processing gas (exhaust gas) into the combustion chamber, respectively, in a tangential direction to the inner circumferential surface of the cylindrical combustion chamber, the three kinds of gases comprising the fuel, the oxidizing gas and the processing gas are mixed to form a swirling flow. Thus, the fuel and the processing gas are combusted by the oxidizing gas to form a cylindrical mixed flame. Specifically, in the combustion chamber, the cylindrical mixed flame of a mixture of the three kinds of gases is formed, and the processing gas can be combusted.

In a preferred aspect of the present invention, a water supply nozzle for forming a water film on the inner circumferential surface of the combustion chamber is provided at a location distant in an axial direction of the combustion chamber from a blowing position of the fuel, the oxidizing gas and the processing gas.

According to the present invention, a water film (wet wall) can be formed on the inner wall surface (inner circumferential surface) of the combustion chamber in the outer side of the cylindrical mixed flame of a mixture of the three kinds of gases.

In a preferred aspect of the present invention, by the swirling flow of a mixture of three kinds of the fuel, the oxidizing gas and the processing gas, a cylindrical mixed flame is formed in the combustion chamber.

According to the present invention, a distribution in which the three kinds of unburned gases mixed together and having a low temperature and a heavy weight are positioned at an outer part of the cylindrical mixed flame, and a gas having a high temperature and a light weight after the three kinds of gases mixed together are burned is positioned at an inner part of the cylindrical mixed flame is formed by a swirling centrifugal force. Therefore, the cylindrical mixed flame becomes in a state where the cylindrical mixed flame is covered with the three kinds of unburned gases mixed together and having a low temperature and is thus thermally self-insulated, and hence a lowering of temperature due to heat dissipation does not occur and the gas treatment having a high combustion efficiency can be performed.

In a preferred aspect of the present invention, the water film on the inner circumferential surface of the combustion chamber is swirled by a swirling force of the cylindrical mixed flame.

Advantageous Effects of Invention

According to the present invention, by blowing the fuel (fuel gas), the oxidizing gas (oxygen-containing gas), and the processing gas (exhaust gas) into the combustion chamber, respectively, in a tangential direction to the inner circumferential surface of the cylindrical combustion chamber, the fuel and the processing gas are combusted by the oxidizing gas to form a cylindrical mixed flame. Specifically, in the combustion chamber, the cylindrical mixed flame of a mixture of the three kinds of gases is formed in the same combustion field, and the processing gas is combusted. Therefore, the following effects can be obtained.

(1) By introducing the three kinds of gases, respectively, in a tangential direction to the inner circumferential surface of the combustion chamber, a distribution in which a gas having a high temperature and a light weight after combustion is positioned at an inner part of the cylindrical mixed flame, and an unburned gas having a low temperature and a heavy weight is positioned at an outer part of the cylindrical mixed flame is formed by a swirling centrifugal force. Because the cylindrical mixed flame is in a thermally self-insulated state due to structure of the flame, heat dissipation is small and high-efficiency combustion can be performed. Therefore, generation of CO generated in the case of a low-temperature flame can be suppressed, and heat damage of the combustion chamber can be prevented.

(2) By mixing and combusting the three kinds of gases, a flame having no local high-temperature part is formed, and hence generation of thermal NOx can be suppressed and melting or adhesion of the by-product can be prevented.

(3) By mixing the three kinds of gases, the fuel and oxygen are diluted with $N_2$ gas as a main component of the inflow gas, and thus a ratio of unburned gas at the outer part of the cylindrical mixed flame is increased to cause a diameter of the flame to be small. Specifically, self-heat insulating properties of the flame can be promoted.

(4) By mixing and combusting the three kinds of gases, the flame whose self-heat insulating properties are improved is formed. Therefore, even if water for forming wet wall is flowed outside the flame, the water and the high-temperature flame are not brought into direct contact with each other. Because the temperature rise of water can be suppressed, the mixed combustion and heat insulation flame can be formed inside the wet wall without lowering the combustion efficiency. Therefore, the following effects can be obtained.

A. The ignition position of the cylindrical mixed flame is located immediately below the port for an inflow gas, and oxidation reaction of the inflow gas is initiated from the position of the water for forming wet wall. Because the powdery product such as $SiO_2$ generated by oxidation reaction is collected by water for forming wet wall due to a swirling centrifugal force, the powdery product is not deposited in the combustion chamber. The produced powdery product such as $SiO_2$ is collected by the water for forming wet wall due to the swirling centrifugal force immediately after its production, and hence the efficiency for removing the powdery product as an abatement device can be improved. Specifically, the scrubber performance can be improved.

B. Because the inner wall of the combustion chamber is covered with water for forming wet wall, the inner wall of the combustion chamber is not brought into contact with a corrosive gas such as HF or $Cl_2$.

C. Conventionally, since the high-temperature corrosive gas and the combustor body are brought into direct contact with each other, it is necessary to use an expensive corrosion-resistant and heat-resistant material. However, according to the present invention, because corrosion can be prevented by flowing water for forming wet wall on the inner wall of the combustion chamber, an inexpensive stainless material can be used. Specifically, the entirety of the combustor including the combustion chamber can be made of stainless material.

D. In order to form the wet wall (water film) uniformly on the inner wall of the combustor, conventionally, it is necessary to supply water for forming wet wall by a swirling flow and to apply special processing for improving wettability to the inner wall surface. However, according to the mixed combustion and heat insulation flame of the present invention, since water for forming wet wall is also swirled by the swirling flow of the gas, it is unnecessary to apply processing for improving wettability to the inner wall surface of the combustion chamber.

DESCRIPTION OF EMBODIMENTS

Figure 1:
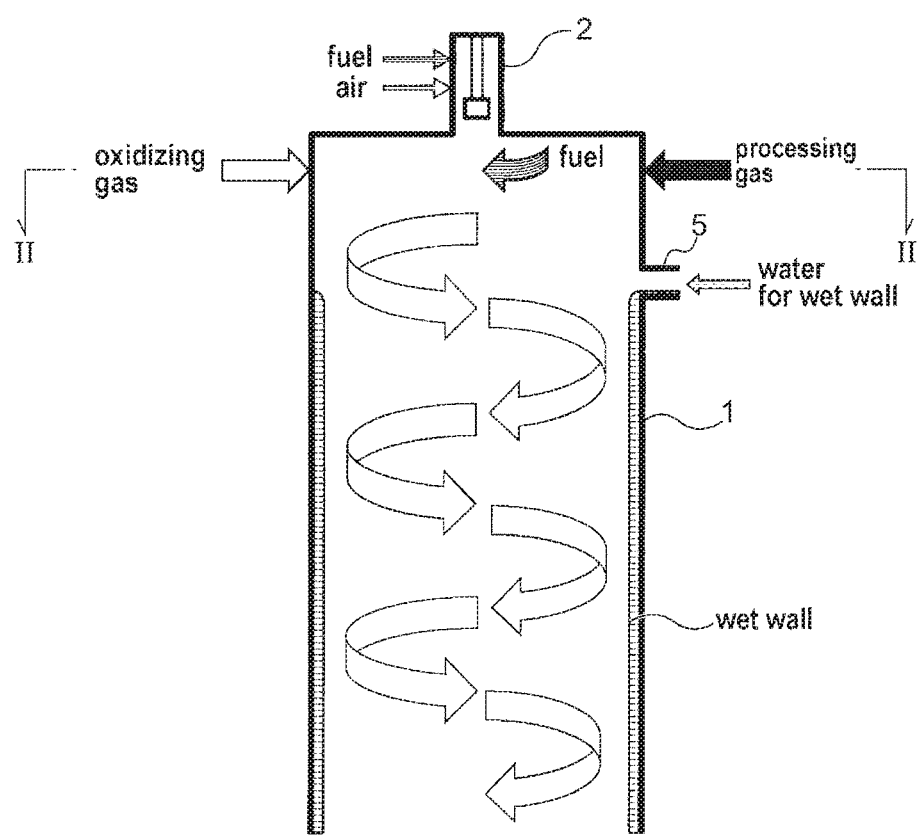
FIG. 1 is a schematic cross-sectional view showing a structural example of a combustion chamber of an exhaust gas treatment apparatus according to the present invention.

An exhaust gas treatment apparatus according to embodiments of the present invention will be described with reference to FIGS. 1 through 6. In FIGS. 1 through 6, identical or corresponding parts are denoted by identical or corresponding reference numerals throughout views, and will not be described in duplication.

FIG. 1 is a schematic cross-sectional view showing a structural example of a combustion chamber of the exhaust gas treatment apparatus according to the present invention. A combustion chamber 1 is configured to be a cylindrical container-shaped combustion chamber having one end (an upper end in the illustrated example) which is closed and the other end (a lower end in the illustrated example) which is open. The cylindrical container-shaped combustion chamber 1 is configured so that a fuel (fuel gas), an oxidizing gas (oxygen-containing gas) and a processing gas (exhaust gas) are blown into the combustion chamber 1 in the vicinity of the closed end portion. A pilot burner 2 for ignition is provided at the closed end portion of the combustion chamber 1, and a fuel and air are supplied to the pilot burner 2. In FIG. 1, a cleaning unit or the like located below the combustion chamber 1 is omitted from the illustration.

Figure 2:
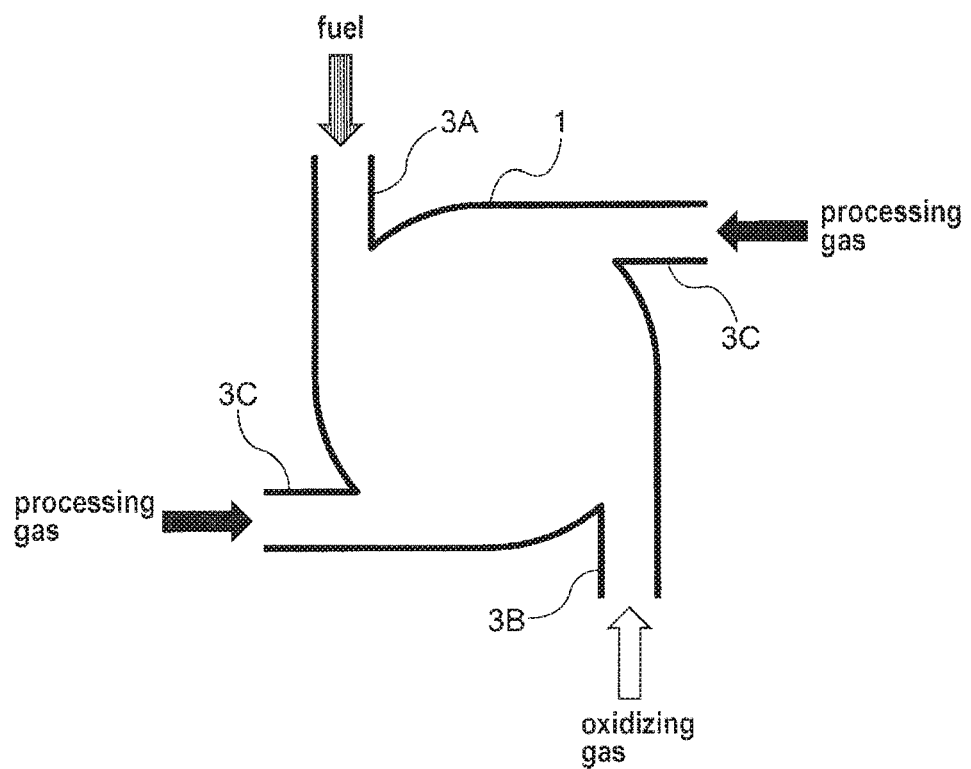
FIG. 2 is a cross-sectional view taken along line II-II of FIG. 1.

FIG. 2 is a cross-sectional view taken along line II-II of FIG. 1. As shown in FIG. 2, a fuel nozzle 3A for blowing a fuel, an oxidizing gas nozzle 3B for blowing an oxidizing gas, and a processing gas nozzle 3C for blowing a processing gas are provided, respectively, in a tangential direction to an inner circumferential surface of the combustion chamber 1. In the example shown in FIG. 2, one fuel nozzle 3A and one oxidizing gas nozzle 3B are provided and two processing gas nozzles 3C are provided. However, the number of respective nozzles 3A, 3B, and 3C can be changed properly according to the size of the combustion chamber, the installation space, and the like. It is possible to install sets of the fuel nozzle 3A, the oxidizing gas nozzle 3B and the processing gas nozzle 3C, which are disposed in the same plane, at a plurality of stages. In this case, the stability of flame can be improved by changing the balance of a fuel flow rate, an oxidizing gas flow rate and a processing gas flow rate. The fuel nozzle 3A for blowing the fuel, the oxidizing gas nozzle 3B for blowing the oxidizing gas, and the processing gas nozzle 3C for blowing the processing gas are positioned in the same plane perpendicular to an axis of the cylindrical combustion chamber 1. Here, "three nozzles are positioned in the same plane" is defined as "portions of openings at the inner circumferential surface side of the combustion chamber in the three nozzles are positioned in the same plane."

As shown in FIG. 1, a water supply nozzle 5 for supplying water which forms a wet wall (water film) on the inner wall surface of the combustion chamber 1 is provided on the combustion chamber 1 at a location slightly below the blowing position of the fuel, the oxidizing gas and the processing gas.

In the combustion chamber 1 configured as shown in FIGS. 1 and 2, the fuel, the oxidizing gas and the processing gas are blown at a flow velocity equal to or higher than a combustion velocity of the flame, respectively, in a tangential direction to the inner circumferential surface of the combustion chamber 1 from the fuel nozzle 3A, the oxidizing gas nozzle 3B and the processing gas nozzles 3C. Thus, a cylindrical mixed flame of a mixture of the three kinds of gases which is distant from the inner wall of the combustion chamber 1 is formed. The cylindrical mixed flame is formed in an axial direction of the combustion chamber 1. By blowing the three kinds of gases, respectively, in a tangential direction, a distribution in which the three kinds of unburned gases mixed together and having a low temperature and a heavy weight are positioned at an outer part of the cylindrical mixed flame, and a gas having a high temperature and a light weight after the three kinds of gases mixed together are burned is positioned at an inner part of the cylindrical mixed flame is formed by a swirling centrifugal force. Therefore, the cylindrical mixed flame becomes in a state where the cylindrical mixed flame is covered with the three kinds of unburned gases mixed together and having a low temperature and is thus thermally self-insulated, and hence a lowering of temperature due to heat dissipation does not occur and the gas treatment having a high combustion efficiency can be performed. Further, because the processing gas is normally diluted with $N_2$ gas or the like and is then introduced into the exhaust gas treatment apparatus, the processing gas containing $N_2$ gas is mixed with the fuel and the oxidizing gas and combusted together, thus becoming slow combustion, and hence a local high-temperature portion is not formed, thus suppressing generation of NOx.

Further, because the processing gas containing $N_2$ gas is mixed with the fuel and the oxidizing gas and combusted together, a diameter of the cylindrical flame becomes small, and hence the temperature of the inner wall surface of the combustion chamber 1 is lowered. Specifically, since the heat insulating properties which are characteristic of the present combustion method are promoted, as shown in FIG. 1, even if wet wall (water film) is formed on the inner wall surface of the combustion chamber 1, the temperature of the flame and the temperature of the combustion gas at the inner part of the flame are not lowered. The powdery product such as $SiO_2$ generated after combustion is collected by water for forming wet wall located at the outer side of the flame by the centrifugal force of the swirling flow of the gas and is washed away downward, and thus the powdery product is not deposited on the inner wall surface of the combustion chamber 1. Further, since most of the powdery product is collected by the water for forming wet wall in the combustion chamber, scrubber performance (powdery product removing performance) of the exhaust gas treatment apparatus can be improved. The corrosive gas is also washed away by the water for forming wet wall, and hence corrosion of the inner wall surface of the combustion chamber 1 can be prevented. Further, since the inner wall surface of the combustion chamber 1 is kept at a low temperature by the water for forming wet wall, the heat damage can be prevented, and the combustion chamber 1 can be composed of an inexpensive material such as stainless steel to reduce the manufacturing cost.

Next, a treatment example of the processing gas (exhaust gas) by the combustion chamber 1 configured as shown in FIGS. 1 and 2 will be described.

Suitable flow rates of the fuel and the oxidizing gas which can ensure the gas temperature required for the gas treatment while keeping composition of a mixture of the three kinds of gases comprising a processing gas (containing $N_2$ gas as one of main components), a fuel gas and an oxidizing gas within combustion range are set on the basis of the flow rate of the processing gas flowing into the combustion chamber 1. The relationship between the composition of the three kinds of gases and the combustion range when the fuel gas comprises a propane gas will be explained. When the oxidizing gas comprises pure oxygen and the processing gas does not contain $N_2$, the propane component % with respect to the mixture is 2% at the lower limit of combustion and 40% at the upper limit of combustion. It is known that when the oxidizing gas comprises air (composition ratio of $N_2$ and $O_2$=79:21), the propane component % with respect to the mixture is 2% at the lower limit of combustion and 10% at the upper limit of combustion. It is known that when the composition ratio of $N_2$ and $O_2$ becomes 85:15, for example, by adding $N_2$ as one of main components of the processing gas to air, the propane component % with respect to the mixture is 2% at the lower limit of combustion and 6% at the upper limit of combustion. If the fuel gas (fuel) comprises another gas such as a city gas or a natural gas, the combustion range of the mixture should be determined in the same way as the fuel gas comprises a propane gas. Specifically, the combustion range of the mixture can be adjusted based on the relationship between the combustion range and the composition of the mixture comprising a fuel gas, an oxidizing gas (oxygen and air), and $N_2$ of a processing gas. In the case where sets of the fuel nozzle 3A, the oxidizing gas nozzle 3B and the processing gas nozzle 3C which are disposed in the same plane are installed at two stages, for example, the balance (composition ratio) of the fuel flow rate, the oxidizing gas flow rate and the processing gas flow rate is changed, for example, the processing gas inflow rate at the upper stage is reduced and the processing gas inflow rate at the lower stage is increased, whereby the stability of the flame can be improved.

In the embodiment shown in FIGS. 1 and 2, the case where the fuel nozzle 3A, the oxidizing gas nozzle 3B and the processing gas nozzle 3C are positioned in the same plane perpendicular to the axis of the cylindrical combustion chamber 1 has been described. However, even if the three nozzles 3A, 3B, and 3C are disposed at different positions in the axial direction of the combustion chamber 1, the cylindrical mixed flame of a mixture of the three kinds of gases which is distant from the inner wall of the combustion chamber 1 can be formed if the following conditions (1) and (2) are met. Each of the nozzles 3A, 3B, and 3C may be divided into a plurality of nozzles, and the divided nozzles may be disposed at certain intervals in a circumferential direction of the combustion chamber 1.

(1) The fuel (fuel gas), the oxidizing gas and the processing gas are blown, respectively, in a tangential direction to the inner circumferential surface of the combustion chamber from the fuel nozzle 3A, the oxidizing gas nozzle 3B and the processing gas nozzle 3C to thereby form a swirling flow of a mixture of the three kinds of gases comprising the fuel, the oxidizing gas and the processing gas.

(2) Among the fuel (fuel gas), the oxidizing gas and the processing gas to be blown into the combustion chamber, when at least one gas is lastly blown into the combustion chamber to form the swirling flow of a mixture of the three kinds of gases, the composition of the mixture of the three kinds of gases reaches the combustion range.

If the above conditions (1) and (2) are met, the cylindrical mixed flame of a mixture of the three kinds of gases which is distant from the inner wall of the combustion chamber 1 can be formed. After the cylindrical mixed flame of a mixture of the three kinds of gases is formed, by blowing a fuel and a processing gas from another fuel nozzle 3A and another processing gas nozzle 3C provided at the downstream side (subsequent stage) of the fuel nozzle 3A, the oxidizing gas nozzle 3B and the processing gas nozzle 3C, the combustion temperature can be increased and the gas treatment performance can be improved.

Next, various embodiments in which the above conditions (1) and (2) are met will be described with reference to drawings.

First, as a nozzle for forming a swirling flow initially by blowing a gas initially into the combustion chamber 1, i.e., a nozzle for initiating the swirling flow, which nozzle should be selected from the fuel nozzle 3A, the oxidizing gas nozzle 3B and the processing gas nozzle 3C will be described, and how other nozzles should be arranged toward a downstream side of the swirling flow by using the selected nozzle as a benchmark will be described.

FIGS. 3(a) and 3(b) are schematic views showing the case where a set of the fuel nozzle 3A, the oxidizing gas nozzle 3B and the processing nozzle 3C is disposed at a single stage (or an upper stage in the case of two stages) and the nozzle for blowing the processing gas is small in number (single nozzle). FIG. 3(a) is a partial cross-sectional view of the combustion chamber and FIG. 3(b) is a horizontal cross-sectional view of the combustion chamber.

When the oxidizing gas comprises air and an air ratio is 1.3, air of approximately 15 times the fuel flow rate is required. In this case, the element to control the swirling force in the combustion chamber is a flow rate of air and a flow velocity of air. Therefore, as shown in FIGS. 3(a) and 3(b), the oxidizing gas nozzle 3B for blowing air as an oxidizing gas is selected as a nozzle for initiating the swirling flow. By selecting the oxidizing gas nozzle 3B as a nozzle for initiating the swirling flow, the top panel of the combustion chamber is cooled by the oxidizing gas immediately before the flame is formed, and thus the heat quantity loss caused by heat dissipation from the top panel can be reduced to make a contribution to energy saving.

The process gas nozzle 3C and the fuel nozzle 3A are arranged in this order toward the downstream side of the swirling flow by using the selected oxidizing gas nozzle 3B as a benchmark. Specifically, by arranging the processing gas nozzle 3C for blowing the processing gas composed mainly of diluted $N_2$ between the oxidizing gas nozzle 3B and the fuel nozzle 3A, the oxidizing gas is mixed with the processing gas (composed mainly of $N_2$) and is then mixed with the fuel gas to ignite the fuel gas, and thus a local high-temperature part is not formed and the flame having a uniform temperature field is formed. Therefore, while the gas treatment performance is improved, generation of thermal NOx can be suppressed.

In FIGS. 3(a) and 3(b), the configuration in which the fuel nozzle 3A, the oxidizing gas nozzle 3B and the processing gas nozzle 3C are positioned in the same plane perpendicular to the axis of the cylindrical combustion chamber 1 has been exemplified. However, if the three nozzles 3A, 3B, and 3C are arranged at different positions in the axial direction of the combustion chamber 1, in FIG. 3(a), the oxidizing gas nozzle 3B may be arranged at the uppermost stage, and the processing gas nozzle 3C and the fuel nozzle 3A may be arranged in this order at different positions in a downward direction. In the cross-sectional view of FIG. 3(a), the nozzle 3C which is located on the near side (front side) is shown by an imaginary line. The same holds true for the following drawings.

FIGS. 4(a) and 4(b) are schematic views showing an example of a lower stage set in the case where sets of the fuel nozzle 3A, the oxidizing gas nozzle 3B and the processing gas nozzle 3C are arranged one above the other at two stages when the nozzles for blowing the processing gas cannot be arranged only by a single stage. FIG. 4(a) is a partial cross-sectional view of the combustion chamber and FIG. 4(b) is a horizontal cross-sectional view.

As shown in FIGS. 4(a) and 4(b), the lower stage set is configured such that an oxidizing gas nozzle 3B is arranged at the uppermost stream side of the swirling flow, and a processing gas nozzle 3C-1, a processing gas nozzle 3C-2, a fuel nozzle 3A and a processing gas nozzle 3C-3 are arranged in this order toward the downstream side of the swirling flow by using the oxidizing gas nozzle 3B as a benchmark.

In this manner, by arranging the three kinds of nozzles 3A, 3B, 3C-1, 3C-2 and 3C-3 also at the lower stage set, the mixing degree of gases can be uniformized, and thus a local high-temperature part is not formed and the flame having a uniform temperature field can be formed. Therefore, while the gas treatment performance is improved, generation of thermal NOx can be suppressed.

FIGS. 5(a) and 5(b) are schematic views showing another example of a lower stage set in the case where sets of nozzles are arranged one above the other at two stages when the nozzles for blowing the processing gas cannot be arranged only by a single stage. FIG. 5(a) is a partial cross-sectional view of the combustion chamber and FIG. 5(b) is a horizontal cross-sectional view.

As shown in FIGS. 5(a) and 5(b), the lower stage set is configured such that the processing gas nozzle 3C-1 is arranged at the uppermost stream side of the swirling flow, and the processing gas nozzle 3C-2, the fuel nozzle 3A and the processing gas nozzle 3C-3 are arranged in this order toward the downstream side of the swirling flow by using the processing gas nozzle 3C-1 as a benchmark.

In the case where a persistent gas or the like is introduced into the combustion chamber as a processing gas, it is necessary to form a temperature field having a high temperature by adding oxygen to air for the oxidizing gas. In the case where it is necessary to form a temperature field having a high temperature, the upper stage set has the same configuration as the set of FIGS. 3(a) and 3(b), and the lower stage set is arranged to be the set shown in FIGS. 5(a) and 5(b) by removing the oxidizing gas nozzle from the set shown in FIGS. 4(a) and 4(b) and the oxidizing gas nozzle is provided only at the upper stage set. The formation position of the flame moves to more upstream side of the swirling flow than the case of the lower stage set shown in FIGS. 4(a) and 4(b), and the volume of the flame can be small, thereby forming a temperature field having higher temperature.

Figure 3:
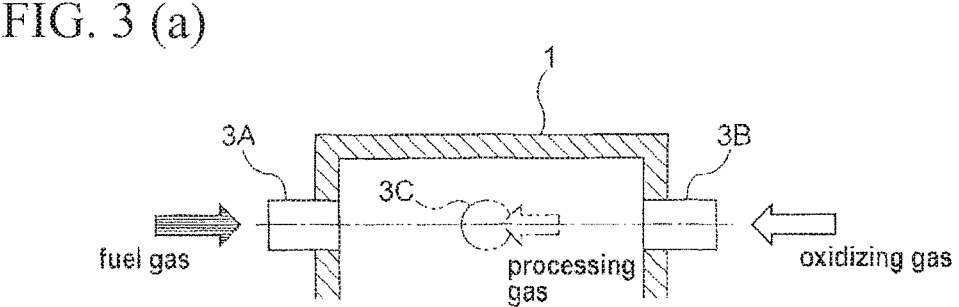
FIGS. 3(a) and 3(b) are schematic views showing the case where a set of a fuel nozzle, an oxidizing gas nozzle, and a processing gas nozzle is disposed at a single stage (or an upper stage in the case of two stages) and the processing gas nozzle for blowing the processing gas is small in number (single nozzle), FIG. 3(a) being a partial cross-sectional view of the combustion chamber and FIG. 3(b) being a horizontal cross-sectional view of the combustion chamber.
Figure 3:
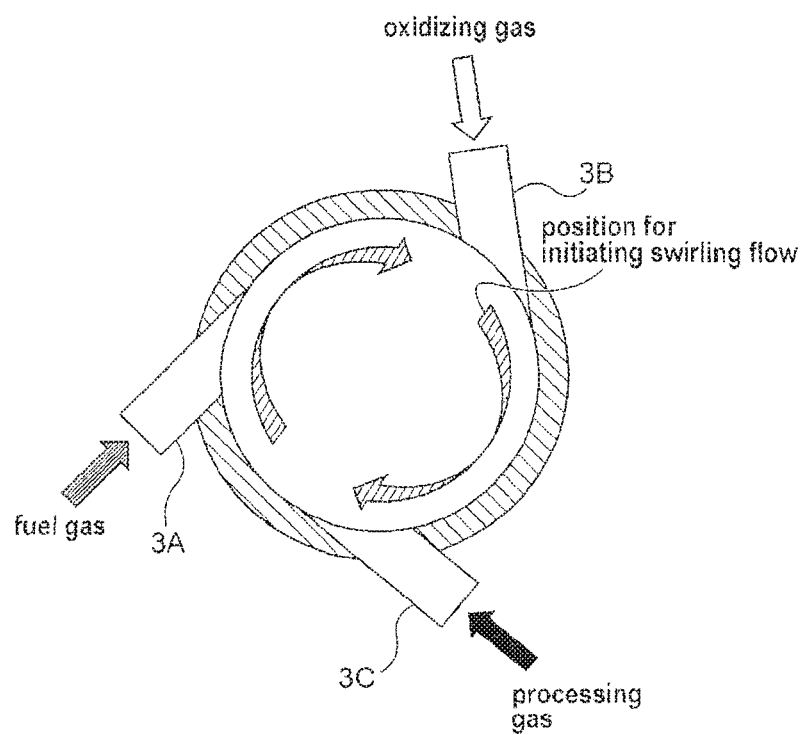
Figure 4:
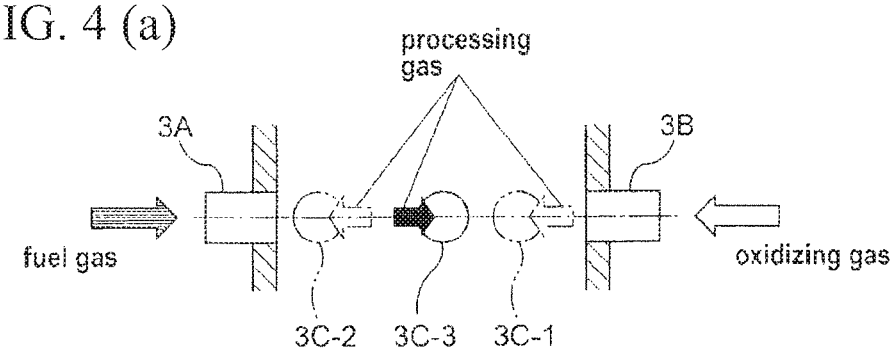
FIGS. 4(a) and 4(b) are schematic views showing an example of a lower stage set in the case where sets of the fuel nozzle, the oxidizing gas nozzle, and the processing gas nozzle are arranged one above the other at two stages when the processing gas nozzles for blowing the processing gas cannot be arranged only by a single stage, FIG. 4(a) being a partial cross-sectional view of the combustion chamber and FIG. 4(b) being a horizontal cross-sectional view.
Figure 4:
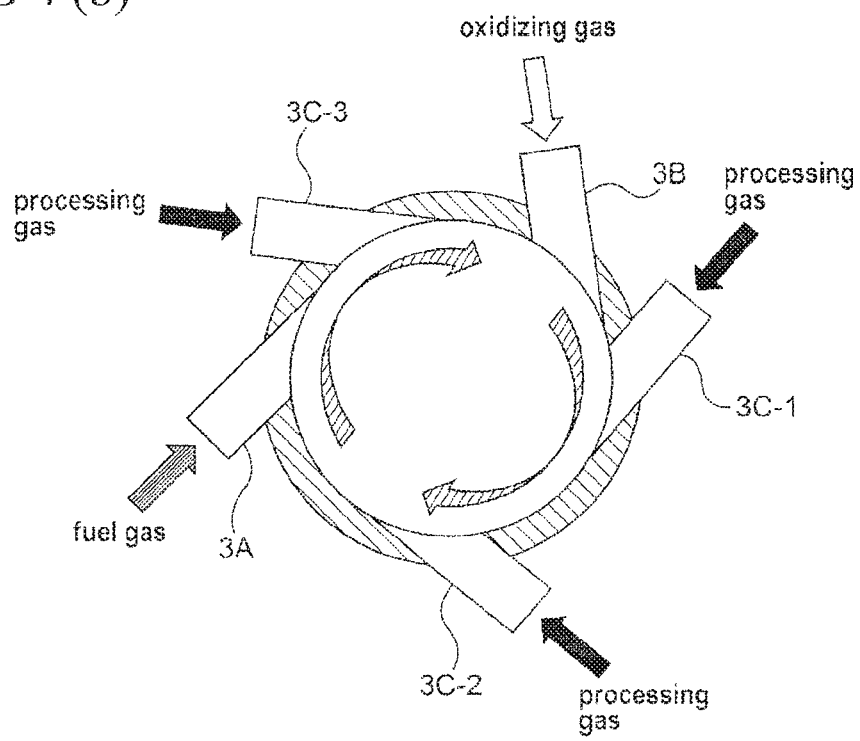
Figure 5:
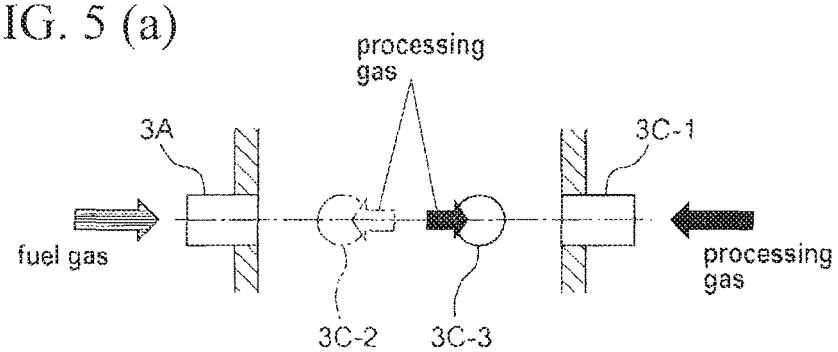
FIGS. 5(a) and 5(b) are schematic views showing another example of a lower stage set in the case where sets of nozzles are arranged one above the other at two stages when the processing gas nozzles for blowing the processing gas cannot be arranged only by a single stage, FIG. 5(a) being a partial cross-sectional view of the combustion chamber and FIG. 5(b) being a horizontal cross-sectional view.
Figure 5:
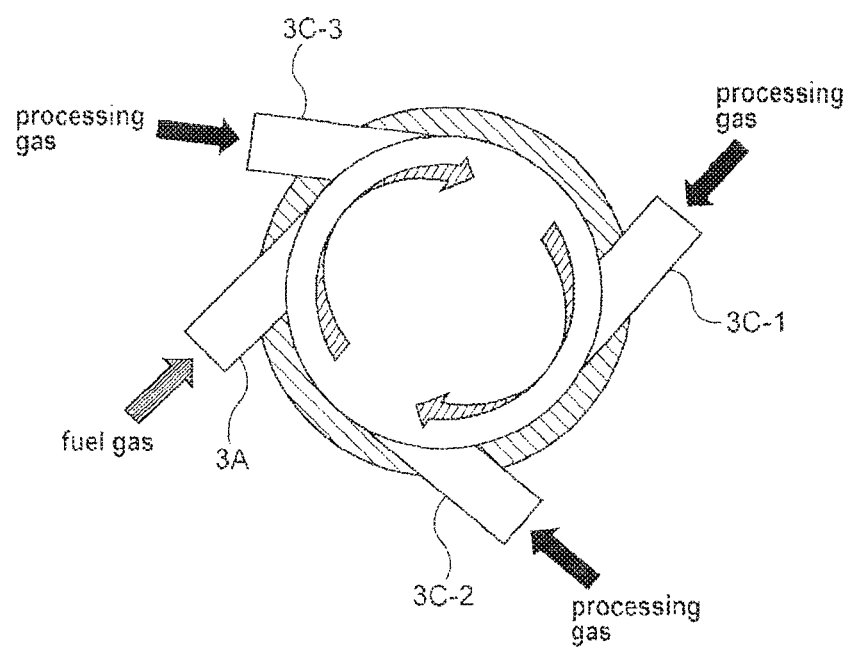

In the combustion chamber 1 configured as shown in FIGS. 1 through 3, the fuel gas, the oxidizing gas and the processing gas are blown at a flow velocity equal to or higher than the combustion velocity of the flame. In this case, the flow velocities of the fuel gas, the oxidizing gas and the processing gas are adjusted so that a swirl number (dimensionless number representing a swirling strength) becomes in the range of 5 to 40. In this manner, by adjusting the flow velocities of the fuel gas, the oxidizing gas and the processing gas on the basis of the swirl number, a desired cylindrical mixed flame can be formed. Further, because the stability of flame can be improved, it is effective to form a flame at all times by the pilot burner 2.

Figure 6:
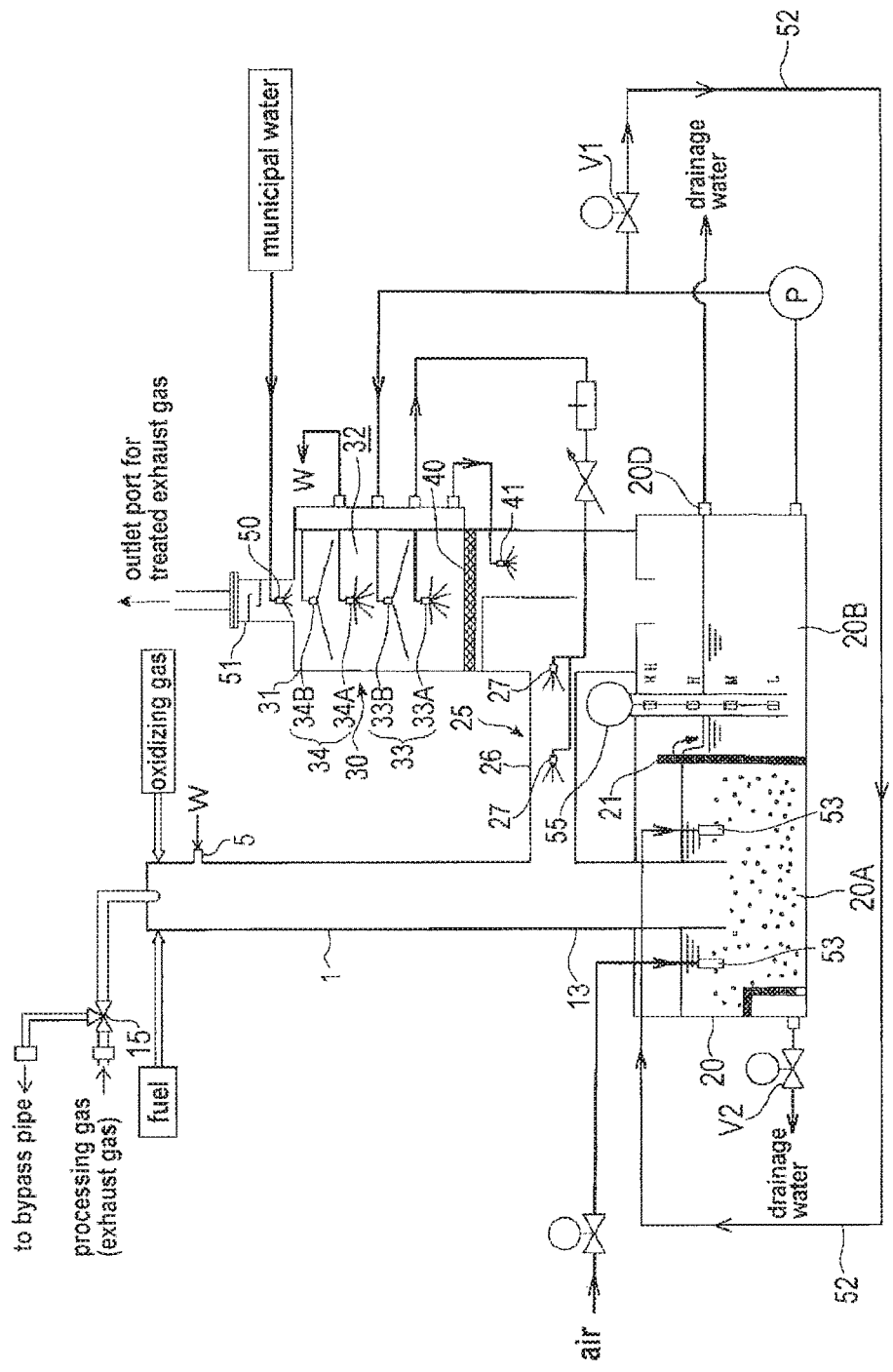
FIG. 6 is a schematic view showing an entire structure of an exhaust gas treatment apparatus having the combustion chamber shown in FIGS. 1 through 3.

FIG. 6 is a schematic view showing an entire structure of an exhaust gas treatment apparatus having the combustion chamber 1 shown in FIGS. 1 through 3. As shown in FIG. 6, the exhaust gas treatment apparatus comprises the combustion chamber 1 for oxidatively decomposing a processing gas (exhaust gas) through combustion, and an exhaust gas cleaning unit 30 arranged at a stage subsequent to the combustion chamber 1. The combustion chamber 1 extends downwardly by a connecting pipe 13. The processing gas (exhaust gas) is supplied into the combustion chamber 1 in a tangential direction to the inner circumferential surface of the cylindrical combustion chamber 1 via a bypass valve (three-way valve) 15. If any problem is detected on the exhaust gas treatment apparatus, the bypass valve 15 is operated so that the processing gas is supplied to a bypass pipe (not shown) without being introduced into the exhaust gas treatment apparatus. Similarly, the fuel and the oxidizing gas are supplied into the combustion chamber 1, respectively, in a tangential direction to the inner circumferential surface of the combustion chamber 1. In this manner, by blowing the fuel, the oxidizing gas and the processing gas into the combustion chamber, respectively, in a tangential direction to the inner circumferential surface of the combustion chamber 1 at a flow velocity equal to or higher than the combustion velocity of the flame, a cylindrical mixed flame of a mixture of the three kinds of gases which is distant from the inner wall of the combustion chamber 1 is formed. Because water W is supplied from the water supply nozzle 5 to the upper part of the combustion chamber 1, the water W flows down along the inner surface of the combustion chamber 1 to form a wet wall (water film) on the inner surface of the combustion chamber. The water for forming wet wall collects the powdery product such as $SiO_2$ generated by combustion of the processing gas.

A circulating water tank 20 is disposed below the combustion chamber 1. A weir 21 is provided inside the circulating water tank 20, and the circulating water tank 20 is partitioned by the weir 21 into a first tank 20A at an upstream side and a second tank 20B at a downstream side. The powdery product collected by water for forming wet wall falls on the interior of the first tank 20A of the circulating water tank 20 through the connecting pipe 13 and is accumulated on the bottom of the first tank 20A. Further, the water for wet wall which have flowed down along the inner surface of the combustion chamber 1 flows into the first tank 20A. Water in the first tank 20A flows over the weir 21 and flows into the second tank 20B.

The combustion chamber 1 communicates with an exhaust gas cleaning unit 30 through a cooling unit 25. This cooling unit 25 has a piping 26 extending toward the connecting pipe 13 and a spray nozzle 27 arranged in the piping 26. The spray nozzle 27 sprays water countercurrently into the exhaust gas flowing in the piping 26. Therefore, the exhaust gas treated by the combustion chamber 1 is cooled by water sprayed from the spray nozzle 27. The ejected water is recovered to the circulating water tank 20 through the piping 26.

The cooled exhaust gas is then introduced into the exhaust gas cleaning unit 30. This exhaust gas cleaning unit 30 is an apparatus for cleaning the exhaust gas with water and removing fine dust contained in the exhaust gas. This dust is mainly composed of powdery product produced by oxidative decomposition (combustion treatment) in the combustion chamber 1.

The exhaust gas cleaning unit 30 comprises a wall member 31 for forming a gas passage 32, and a first mist nozzle 33A, a first water film nozzle 33B, a second mist nozzle 34A and a second water film nozzle 34B disposed in the gas passage 32. These mist nozzles 33A and 34A and water film nozzles 33B and 34B are located at the central portion of the gas passage 32, and are arranged substantially linearly. The first mist nozzle 33A and the first water film nozzle 33B constitute a first nozzle unit 33, and the second mist nozzle 34A and the second water film nozzle 34B constitute a second nozzle unit 34. Therefore, in this embodiment, two sets of nozzle units 33 and 34 are provided. One set of nozzle units or three or more sets of nozzle units may be provided.

The first mist nozzle 33A is disposed further upstream in a flowing direction of an exhaust gas than the first water film nozzle 33B. Similarly, the second mist nozzle 34A is disposed further upstream than the second water film nozzle 34B. Specifically, the mist nozzle and the water film nozzle are alternately disposed. The mist nozzles 33A and 34A, the water film nozzles 33B and 34A, and the wall member 31 are composed of corrosion-resistant resin (e.g., PVC: polyvinyl chloride).

A flow control member 40 for regulating flow of the exhaust gas is disposed at an upstream side of the first mist nozzle 33A. This flow control member 40 causes pressure loss of the exhaust gas and uniformizes the flow of the exhaust gas in the gas passage 32. It is preferable that the flow control member 40 is composed of a material other than metal in order to prevent acid corrosion. As an example of the flow control member 40, there is a nonwoven material made of resin or a resin plate having a plurality of openings. A mist nozzle 41 is disposed at an upstream side of the flow control member 40. The mist nozzles 33A, 34A and 41 and the water film nozzles 33B and 34B are attached to the wall member 31.

As shown in FIG. 6, the exhaust gas is introduced into the interior of the exhaust gas cleaning unit 30 from the piping 26 provided at a lower portion of the exhaust gas cleaning unit 30. The exhaust gas flows from the lower part to the upper part in the exhaust gas cleaning unit 30. More specifically, the exhaust gas introduced from the piping 26 is first directed toward the mist nozzle 41 of the exhaust gas cleaning unit 30. Then, the exhaust gas passes through the mist formed by the mist nozzle 41 and the flow of the exhaust gas is regulated by the flow control member 40. The exhaust gas which has passed through the flow control member 40 forms a uniform flow and moves upwards through the gas passage 32 at low speed. Mist, water film, mist and water film are formed in this order in the gas passage 32.

Fine dust having a diameter of less than 1 μm contained in the exhaust gas easily adheres to water particles forming mist by diffusion action (Brownian movement), and thus the fine dust is trapped by the mist. Dust having a diameter of not less than 1 μm is mostly trapped by the water particles in the same manner. Since a diameter of the water particles is approximately 100 μm, the size (diameter) of the dust adhering to these water particles becomes large apparently. Therefore, the water particles containing dust easily hits the water film at the downstream side due to inertial impaction, and the dust is thus removed from the exhaust gas together with the water particles. Dust having a relatively large diameter which has not been trapped by the mist is also trapped by the water film in the same manner and is removed. In this manner, the exhaust gas is cleaned by water and the cleaned exhaust gas is discharged from the upper end of the wall member 31.

As shown in FIG. 6, the above-mentioned circulating water tank 20 is disposed below the exhaust gas cleaning unit 30. Water supplied from the mist nozzles 33A, 34A and 41 and the water film nozzles 33B and 34B is recovered into the second tank 20B of the circulating water tank 20. The water stored in the second tank 20B is supplied to the mist nozzles 33A, 34A and 41 and the water film nozzles 33B and 34B by a circulating water pump P. At the same time, the circulating water is supplied to an upper portion of the combustion chamber 1 as water W, and as described above, the wet wall is formed on an inner surface of the combustion chamber 1.

Water to be supplied to the mist nozzles 33A and 34A and the water film nozzles 33B and 34B is water recovered by the circulating water tank 20 and contains dust (such as powdery product). Therefore, in order to clean the gas passage 32, municipal water is supplied to the gas passage 32 from a shower nozzle 50. A mist trap 51 is provided above the shower nozzle 50. This mist trap 51 has a plurality of baffle plates therein and serves to trap the mist. In this manner, the treated and detoxified exhaust gas is finally released into the atmosphere through the exhaust duct.

A water level sensor 55 is provided in the circulating water tank 20. The water level sensor 55 is configured to monitor water level of the second tank 20B and to control the water level of the second tank 20B within a predetermined range. Further, part of water delivered by the circulating water pump P is supplied to a plurality of eductors 53 installed in the circulating water tank 20 through a water supply pipe 52. The water supply pipe 52 has an opening and closing valve V1, and when the opening and closing valve V1 is opened, water can be supplied to the eductors 53. A drain valve V2 for discharging water in the circulating water tank 20 is provided on the circulating water tank 20.

Water in the circulating water tank 20 is pressurized by the circulating water pump P and is supplied to each eductor 53, and water in the circulating water tank 20 is sucked from the suction port of the eductor 53 by utilizing a reduction of pressure generated when the flow of water is throttled by the nozzle of the educator 53. The sucked water is ejected from the discharge port of the eductor 53 together with the water discharged from the nozzle toward a bottom of the circulating water tank 20. By an ejecting and hitting force of water ejected from the discharge port of the eductor 53, the powdery product on the bottom surface of the circulating water tank 20 can be crushed and floated, and is then automatically discharged together with drainage water from a drainage port 20D of the circulating water tank 20.

Although the preferred embodiments of the present invention have been described above, it should be understood that the present invention is not limited to the above embodiments, but various changes and modifications may be made to the embodiments without departing from the scope of the appended claims.

INDUSTRIAL APPLICABILITY

The present invention is applicable to an exhaust gas treatment apparatus for treating an exhaust gas, discharged from a manufacturing apparatus or the like for manufacturing semiconductor devices, liquid crystals, LEDs or the like, by combustion treatment to make the exhaust gas harmless.

REFERENCE SIGNS LIST 1 combustion chamber
2 pilot burner
3A fuel nozzle
3B oxidizing gas nozzle
3C, 3C-1, 3C-2, 3C-3 processing gas nozzle
5 water supply nozzle
13 connecting pipe
15 bypass valve (three-way valve)
20 circulating water tank
20A, 20B tank
20D drainage port
21 weir
25 cooling unit
26 piping
27 spray nozzle
30 exhaust gas cleaning unit
31 wall member
32 gas passage
33A first mist nozzle
33B first water film nozzle
34A second mist nozzle 34B second water film nozzle
40 flow control member
41 mist nozzle
50 shower nozzle
51 mist trap
52 water supply pipe
53 eductor
55 water level sensor
P circulating water pump
V1 opening and closing valve
V2 drain valve

The invention claimed is:

1. An exhaust gas treatment apparatus for treating a processing gas by combustion treatment to make the processing gas harmless, the exhaust gas treatment apparatus comprising:
    a cylindrical combustion chamber configured to combust a processing gas; and
    a fuel nozzle, an oxidizing gas nozzle and a processing gas nozzle provided on the combustion chamber and configured to blow a fuel, an oxidizing gas and the processing gas, respectively, in a tangential direction to an inner circumferential surface of the combustion chamber;
    wherein the fuel nozzle, the oxidizing gas nozzle and the processing gas nozzle are positioned in the same plane perpendicular to an axis of the combustion chamber.

2. The exhaust gas treatment apparatus according to claim 1, wherein a water supply nozzle for forming a water film on the inner circumferential surface of the combustion chamber is provided at a location distant in an axial direction of the combustion chamber from a blowing position of the fuel, the oxidizing gas and the processing gas.

3. The exhaust gas treatment apparatus according to claim 1, wherein by blowing the fuel, the oxidizing gas and the processing gas, respectively, in the tangential direction to the inner circumferential surface of the combustion chamber, a cylindrical mixed flame is formed in the combustion chamber.

4. The exhaust gas treatment apparatus according to claim 2, wherein the water film on the inner circumferential surface of the combustion chamber is swirled by a swirling force of the cylindrical mixed flame.

* * * * *